US012682416B2

(12) United States Patent
    Kikuchi

(10) Patent No.:  US 12,682,416 B2
(45) Date of Patent:        Jul. 14, 2026

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor:  Hiroaki Kikuchi, Tokyo (JP)

(73) Assignee: FUJIFILM Corporation, Tokyo (JP)

( * ) Notice:  Subject to any disclaimer, the term of this patent is extended or adjusted under 35 U.S.C. 154(b) by 158 days.

(21) Appl. No.: 17/821,719

(22) Filed:  Aug. 23, 2022

(65)  Prior Publication Data

US 2022/0405878 A1      Dec. 22, 2022

Related U.S. Application Data

(63) Continuation  of  application  No. PCT/JP2021/008646, filed on Mar. 5, 2021.

(30)  Foreign Application Priority Data

Mar. 16, 2020    (JP) ................................ 2020-045236

(51) Int. Cl.
    *G06V 10/44*      (2022.01)
    *G06T 3/067*      (2024.01)
          (Continued)
(52) U.S. Cl.
    CPC ............... *G06T 3/067* (2024.01); *G06T 5/50* (2013.01); *G06T 7/0002* (2013.01); *G06T 7/13* (2017.01);
          (Continued)
(58) Field of Classification Search
    CPC ......... G06T 3/067; G06T 5/50; G06T 7/0002; G06T 7/13; G06T 2207/20221;
          (Continued)

(56)  References Cited

U.S. PATENT DOCUMENTS

2018/0218535 A1*  8/2018  Ceylan ...................... G06T 7/90
2019/0026955 A1*  1/2019  Ogata ..................... G06T 7/579

FOREIGN PATENT DOCUMENTS

JP        H07-152925 A      6/1995
JP        2004-054852 A      2/2004
                (Continued)

OTHER PUBLICATIONS

International Search Report issued in PCT/JP2021/008646; mailed Apr. 27, 2021.

(Continued)

*Primary Examiner* — Vu Le
*Assistant Examiner* — Zaid Muhammad Saleh
(74) *Attorney, Agent, or Firm* — Studebaker Brackett PLLC

(57)            ABSTRACT

In an aspect, an image processing apparatus includes a processor and a memory in which a plurality of images obtained by capturing images of a building and a three-dimensional model of the building are stored in association with each other. The processor is configured to perform a development process to perform development of the three-dimensional model into a two-dimensional image, an extraction process to extract defect information of the building on the basis of the plurality of images, a mapping process to perform mapping of the defect information to the two-dimensional image, and an output process to output the two-dimensional image to which the mapping is performed.

14 Claims, 15 Drawing Sheets

(51) Int. Cl.

| | | |
|---|---|---|
| *G06T 5/50* | (2006.01) | |
| *G06T 7/00* | (2017.01) | |
| *G06T 7/13* | (2017.01) | |
| *G06T 17/05* | (2011.01) | |
| *G06V 10/24* | (2022.01) | |

(52) U.S. Cl.
CPC .............. *G06T 17/05* (2013.01); *G06V 10/24* (2022.01); *G06V 10/44* (2022.01); *G06T 2207/20221* (2013.01)

(58) Field of Classification Search
CPC ......... G06T 2207/30184; G06T 7/0004; G06T 17/00; G06T 19/00; G06V 10/24; G06V 20/64; E04G 23/00
See application file for complete search history.

(56) References Cited

FOREIGN PATENT DOCUMENTS

| | | | | | | |
|---|---|---|---|---|---|---|
| JP | 2012073119 | A | * | 4/2012 | | |
| JP | 2017-168077 | A | | 9/2017 | | |
| JP | 2019-020348 | A | | 2/2019 | | |
| JP | 2019-049951 | A | | 3/2019 | | |
| JP | 2019094620 | A | * | 6/2019 | | |
| JP | 2019159904 | A | * | 9/2019 | | |
| JP | 2019175350 | A | * | 10/2019 | | |
| KR | 20150128300 | A | * | 11/2015 | ............. | G01B 11/00 |

OTHER PUBLICATIONS

International Preliminary Report on Patentability (Chapter I) and Written Opinion of the International Searching Authority issued in PCT/JP2021/008646; issued Sep. 20, 2022.
An Office Action; "Notice of Reasons for Refusal," mailed by the Japanese Patent Office on Jan. 16, 2024, which corresponds to Japanese Patent Application No. 2022-508212 and is related to U.S. Appl. No. 17/821,719; with English language translation.
Extended European Search Report issued in EP 21771840.2-1207 by the European Patent Office on Jul. 19, 2023, which is related to U.S. Appl. No. 17/821,719.
An Office Action; mailed by the China National Intellectual Property Administration of the People's Republic of China on Jun. 27, 2025, which corresponds to Chinese Patent Application No. 202180017283.9 and is related to U.S. Appl. No. 17/821,719.
Xiao Xiang et al., Crack Repair Technology for Dangerous/Defective Water Engineering, China Water & Power Press, May 30, 2009, pp. 49-67.
Zhang Yong et al., Proceedings of Chang'an University Graduate Academic Papers (2016 Volume), Shaanxi Science & Technology Press, Jun. 30, 2017, pp. 32-38.
Office Action issued in CN 202180017283.9; mailed by the State Intellectual Property Office of the People's Republic of China on Feb. 14, 2026.
An Office Action; mailed by the China National Intellectual Property Administration of the People's Republic of China on Apr. 1, 2026, which corresponds to Chinese Patent Application No. 202180017283.9 and is related to U.S. Appl. No. 17/821,719.

* cited by examiner

FIG. 6

| MEMBER | TYPE OF DEFECT | DIMENSIONS OF DEFECT | DEGREE OF DEFECT | CHANGE OVER TIME |
|---|---|---|---|---|
| PIER ○○1 | CRACKING | L=1.0m | a | +0.1m, a⇒a |
| PIER ○○1 | CRACKING | L=2.1m | b | +0.3m, a⇒b |
| PIER ○○2 | FREE LIME | L=0.5m | c | +0m, c⇒c |
| FLOOR SLAB ○○1 | FREE LIME | L=1.0m | d | +0.2m, c⇒d |
| FLOOR SLAB ○○2 | SCALING | S=1m² | a | +0.25m², a⇒a |
| MAIN GIRDER ○○1 | REINFORCEMENT EXPOSURE | L=0.5m | d | +0.15m, c⇒d |
| MAIN GIRDER ○○2 | BLISTERING | − | d | ±0, d⇒d |
| ABUTMENT ○○2 | SCALING | S=0.5m² | d | +0.2m², d⇒d |
| ABUTMENT ○○2 | WATER LEAK | L=3m | a | ±0m, a⇒a |
| MAIN GIRDER ○○1 | CORROSION | S=3m² | c | +0.4m², c⇒c |

500

550

IMAGE PROCESSING APPARATUS, IMAGE PROCESSING METHOD, AND IMAGE PROCESSING PROGRAM

CROSS-REFERENCE TO RELATED APPLICATIONS

This application is a Continuation of PCT International Application No. PCT/JP2021/008646 filed on Mar. 5, 2021, which claims priority under 35 U.S.C § 119(a) to Japanese Patent Application No. 2020-045236 filed on Mar. 16, 2020. Each of the above application(s) is hereby expressly incorporated by reference, in its entirety, into the present application.

BACKGROUND OF THE INVENTION

1. Field of the Invention

The present invention relates to a technique for handling a captured image of a building, a three-dimensional model of the building, and defect information.

2. Description of the Related Art

For example, JP2019-020348A describes a technique for handling a three-dimensional model and defect information of a building. In the technique, a three-dimensional laser scanner is used to acquire three-dimensional point cloud data of an inner surface of tunnel lining, and this data is used to generate a lining development diagram.

SUMMARY OF THE INVENTION

However, the technique described in JP2019-020348A, which uses a laser scanner, makes it difficult to acquire image data of a photographic subject and provides low resolution of a point cloud. This makes it difficult to efficiently handle captured images of a building, a three-dimensional model of the building, and defect information.

The present invention has been made in view of such circumstances, and an embodiment according to a technique disclosed herein provides an image processing apparatus, an image processing method, and an image processing program that provide efficient handling of a captured image of a building, a three-dimensional model of the building, and defect information.

An image processing apparatus according to a first aspect of the present invention is an image processing apparatus including a processor and a memory in which a plurality of images obtained by capturing images of a building and a three-dimensional model of the building are stored in association with each other. The processor is configured to perform a development process to perform development of the three-dimensional model into a two-dimensional image, an extraction process to extract defect information of the building on the basis of the plurality of images, a mapping process to perform mapping of the defect information to the two-dimensional image, and an output process to output the two-dimensional image to which the mapping is performed.

An image processing apparatus according to a second aspect is the image processing apparatus according to the first aspect, in which the processor is configured to perform a generation process to generate the three-dimensional model of the building on the basis of the plurality of images, and a storage control process to store the three-dimensional model in the memory in association with the plurality of images.

An image processing apparatus according to a third aspect is the image processing apparatus according to the second aspect, in which the processor is configured to reconstruct the generated three-dimensional model such that designated regions of the three-dimensional model are included in the same surface.

An image processing apparatus according to a fourth aspect is the image processing apparatus according to any one of the first to third aspects, in which the processor is configured to perform the development along a designated edge among edges of surfaces constituting the three-dimensional model.

An image processing apparatus according to a fifth aspect is the image processing apparatus according to the fourth aspect, in which the processor is configured to receive designation of the edge for the development.

An image processing apparatus according to a sixth aspect is the image processing apparatus according to any one of the first to fifth aspects, in which the processor is configured to perform the development by dividing a designated region of the three-dimensional model into planes having a designated size.

An image processing apparatus according to a seventh aspect is the image processing apparatus according to any one of the first to sixth aspects, in which the processor is configured to align normal directions of regions constituting the two-dimensional image during the development.

An image processing apparatus according to an eighth aspect is the image processing apparatus according to any one of the first to seventh aspects, in which the processor is configured to perform the development on a designated portion of the three-dimensional model.

An image processing apparatus according to a ninth aspect is the image processing apparatus according to any one of the first to eighth aspects, in which the processor is configured to generate, as the three-dimensional model, at least one of a three-dimensional point cloud model, a three-dimensional mesh model, a three-dimensional surface model, or a three-dimensional solid model.

An image processing apparatus according to a tenth aspect is the image processing apparatus according to any one of the first to ninth aspects, in which the processor is configured to generate a three-dimensional point cloud model as the three-dimensional model and generate at least one of a three-dimensional mesh model, a three-dimensional surface model, or a three-dimensional solid model as the three-dimensional model on the basis of the three-dimensional point cloud model.

An image processing apparatus according to an eleventh aspect is the image processing apparatus according to any one of the first to tenth aspects, in which the processor is configured to generate a composite image based on the plurality of images and perform mapping of the composite image to the two-dimensional image.

An image processing apparatus according to a twelfth aspect is the image processing apparatus according to the eleventh aspect, in which the processor is configured to generate the composite image such that feature points in the plurality of images match or the plurality of images are projected onto the same plane.

An image processing apparatus according to a thirteenth aspect is the image processing apparatus according to any one of the first to twelfth aspects, in which the processor is configured to perform an acquisition process to acquire a plurality of images obtained by capturing images of the building, the plurality of images having different dates and times of capture from the plurality of images stored in the memory, and an association process to associate the plurality of acquired images with the three-dimensional model stored in the memory.

An image processing apparatus according to a fourteenth aspect is the image processing apparatus according to the thirteenth aspect, in which the processor is configured to perform the association process on the basis of a correlation between the plurality of acquired images and the plurality of images stored in the memory.

An image processing method according to a fifteenth aspect of the present invention is an image processing method performed by an image processing apparatus including a processor and a memory in which a plurality of images obtained by capturing images of a building and a three-dimensional model of the building are stored in association with each other, the image processing method causing the processor to perform a process including a development step of developing the three-dimensional model into a two-dimensional image; an extraction step of extracting defect information of the building on the basis of the plurality of images; a mapping step of performing mapping of the defect information to the two-dimensional image; and an output step of outputting the two-dimensional image to which the mapping is performed. The image processing method according to the fifteenth aspect may further have a configuration similar to those according to the second to fourteenth aspects.

An image processing program according to a sixteenth aspect of the present invention causes a computer to execute the image processing method according to the fifteenth aspect. A non-transitory recording medium storing computer-readable codes of the image processing program according to the sixteenth aspect can also be presented as an aspect of the present invention.

As described above, the image processing apparatus, the image processing method, and the image processing program according to the present invention enable a user to efficiently handle captured images of a building, a three-dimensional model of the building, and defect information.

BRIEF DESCRIPTION OF THE DRAWINGS

FIG. 6 is a diagram illustrating an example of defect information;

DESCRIPTION OF THE PREFERRED EMBODIMENTS

An embodiment of an image processing apparatus, an image processing method, and an image processing program according to the present invention is as follows. In the description, reference is made to the accompanying drawings as necessary.

Configuration of Image Processing System

Figure 1:
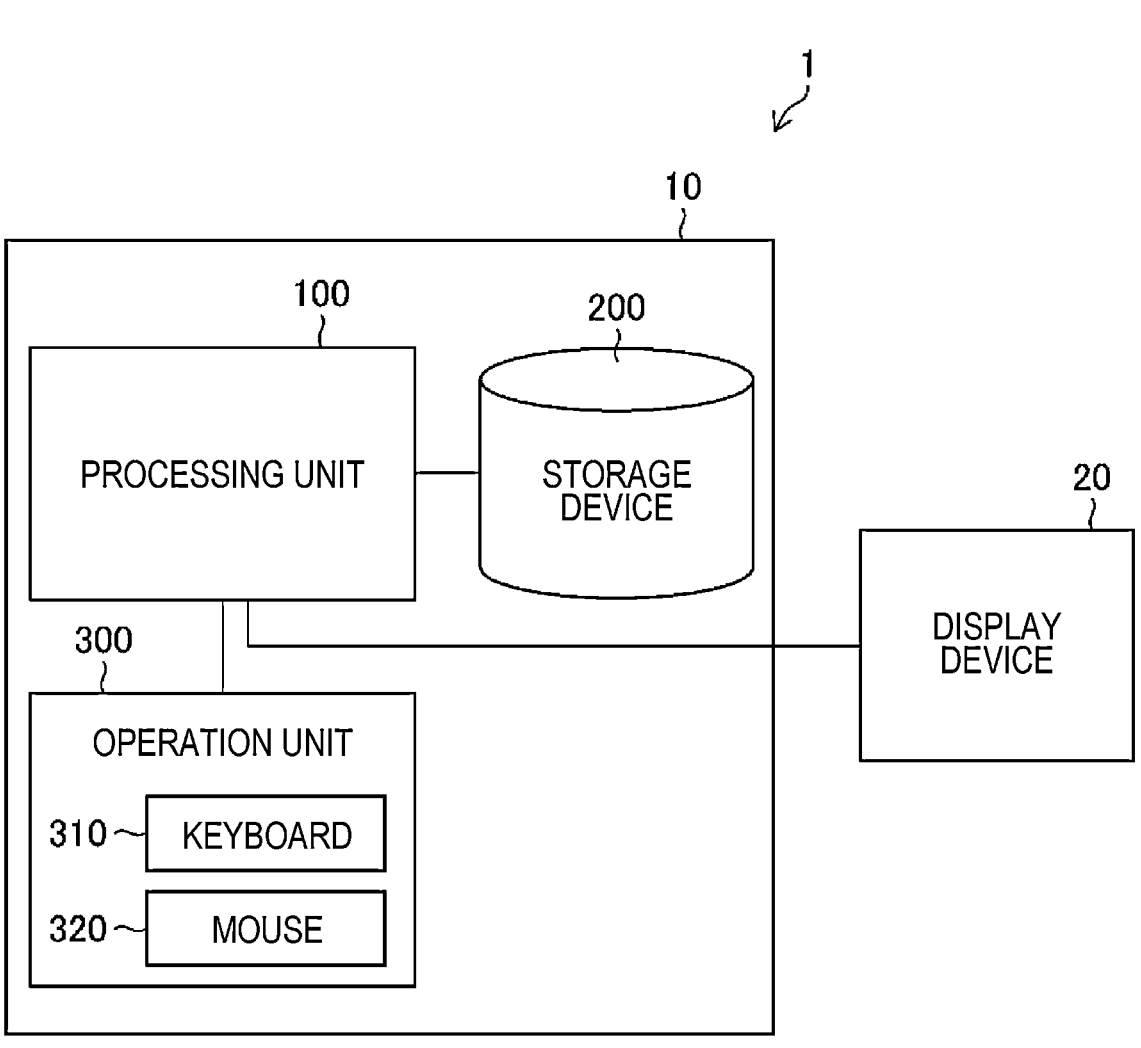
FIG. 1 is a diagram illustrating a schematic configuration of an image processing system according to an embodiment.

FIG. 1 is a block diagram illustrating a schematic configuration of an image processing system 1 (image processing apparatus). The image processing system 1 is a system including an image processing apparatus 10 (image processing apparatus) and a display device 20 (display device; monitor) and configured to extract defect information from a plurality of images acquired by capturing images of parts of a photographic subject (building), create a three-dimensional model, develop the three-dimensional model into a two-dimensional image, and perform other processing. The image processing system 1 can be configured using a device (information terminal) such as a personal computer, a tablet terminal, or a smartphone. The elements of the image processing system 1 may be housed in a single housing or may be housed in independent housings. Alternatively, the elements may be arranged in separate locations and connected to each other via a network.

Configuration of Image Processing Apparatus

The image processing apparatus 10 includes a processing unit 100, a storage device 200, and an operation unit 300, and these units are connected to each other to transmit and receive necessary information.

Configuration of Processing Unit

Figure 2:
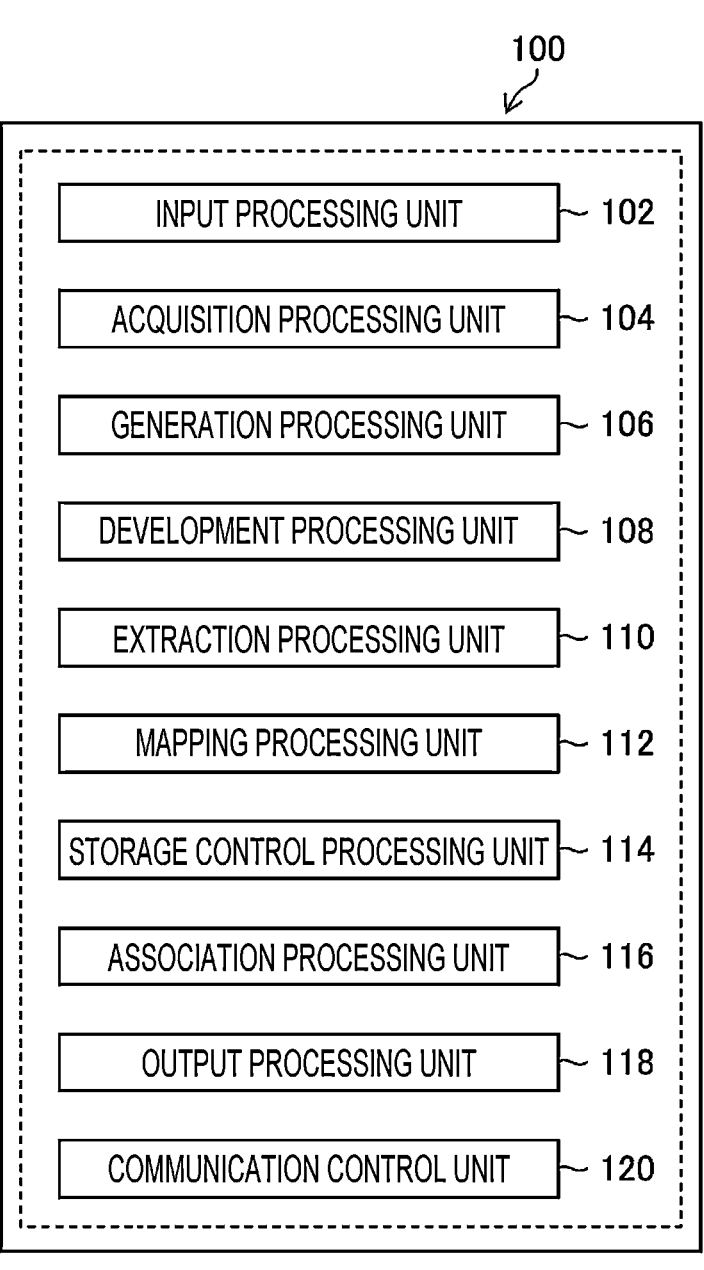
FIG. 2 is a diagram illustrating a functional configuration of a processing unit.

FIG. 2 is a diagram illustrating a configuration of the processing unit 100 (processor). The processing unit 100 includes an input processing unit 102, an acquisition processing unit 104, a generation processing unit 106, a development processing unit 108, an extraction processing unit 110, a mapping processing unit 112, a storage control processing unit 114, an association processing unit 116, an output processing unit 118, and a communication control unit 120, and is configured to perform acquisition of a captured image, creation of a three-dimensional model, development of the three-dimensional model into a two-dimensional image, mapping of defect information, and other processing. Details of processes performed by these units will be described below.

The functions of the processing unit 100 described above can be implemented using various processors and a recording medium. The various processors also include, for example, a central processing unit (CPU), which is a general-purpose processor that executes software (program) to implement various functions, a graphics processing unit (GPU), which is a processor specialized in image processing, and a programmable logic device (PLD) such as a field programmable gate array (FPGA), which is a processor whose circuit configuration is changeable after manufacture.

Each function may be implemented by one processor, or may be implemented by a plurality of processors of the same type or different types (for example, a plurality of FPGAs, a combination of a CPU and an FPGA, or a combination of a CPU and a GPU). Alternatively, a plurality of functions may be implemented by one processor. More specifically, the hardware structure of the various processors is an electric circuit (circuitry) in which circuit elements such as semiconductor elements are combined.

When the processor or electric circuit described above executes software (program), codes of the software to be executed, which are readable by a computer (for example, various processors and electric circuits constituting the processing unit 100, and/or a combination thereof), are stored in a non-transitory recording medium (memory) such as a ROM, and the computer refers to the software. At the time of execution, information stored in the storage device is used as necessary. At the time of execution, for example, a random access memory (RAM; memory) is used as a temporary storage area.

Some or all of the functions of the processing unit 100 may be implemented by a server (processor) on a network, and the image processing apparatus 10 may input data, perform communication control, display a result, and perform other processing. In this case, an Application Service Provider system including the server on the network is constructed.

Configuration of Storage Unit

Figure 3:
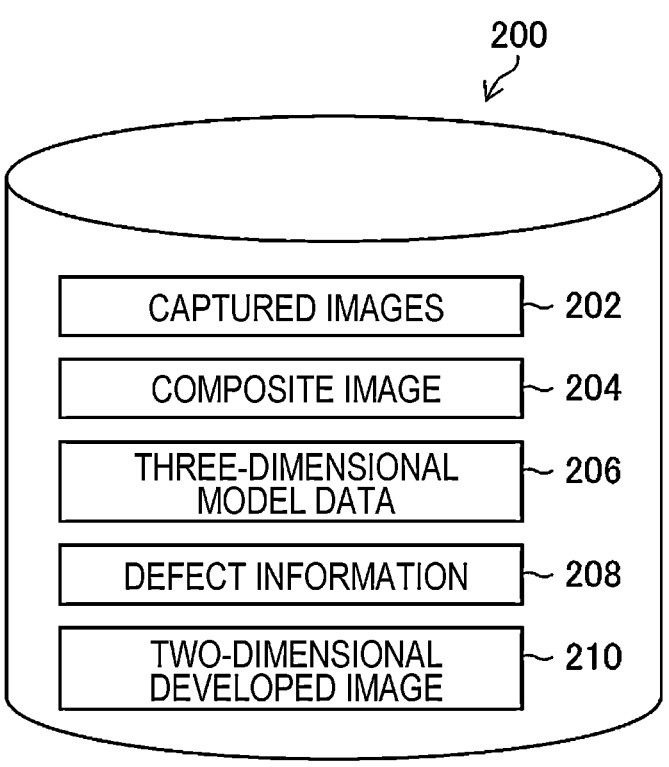
FIG. 3 is a diagram illustrating information stored in a storage device.

The storage device 200 (storage device; memory) is constituted by a non-transitory recording medium such as a compact disk (CD), a digital versatile disk (DVD), a hard disk, or various semiconductor memories, and a control unit thereof, and stores pieces of information illustrated in FIG. 3 in association with each other. Captured images 202 are a plurality of images obtained by capturing images of a building and may include a plurality of image groups having different dates and times of capture. A composite image 204 is a combined image (a set of images) corresponding to a specific member, which is generated from the captured images. Three-dimensional model data 206 (three-dimensional model) is a three-dimensional model of the building, which is created on the basis of the captured images, and members constituting the building are specified. The three-dimensional model data 206 is associated with captured images, a composite image, defect information, and the like. Defect information 208 (defect information) is information indicating defects of the building, which are extracted from the captured images. A two-dimensional developed image 210 (two-dimensional image) is an image obtained by two-dimensionally developing a three-dimensional model of the building.

In addition to the pieces of information described above, camera parameters (such as a focal length, an image size of an image sensor, and a pixel pitch) necessary when Structure from Motion (SfM) described below is applied may be stored in the storage device 200.

Configuration of Operation Unit

The operation unit 300 includes a keyboard 310 and a mouse 320. The user can use these devices to perform operations necessary for image processing according to the present invention. With the use of a touch panel device, the display device 20 may be used as an operation unit.

Display Device

The display device 20 (display device) is a device such as a liquid crystal display, for example, and is capable of displaying information on the captured images, the defect information, the three-dimensional model, the two-dimensional image, and the like that are acquired.

Procedure of Image Processing

Figure 4:
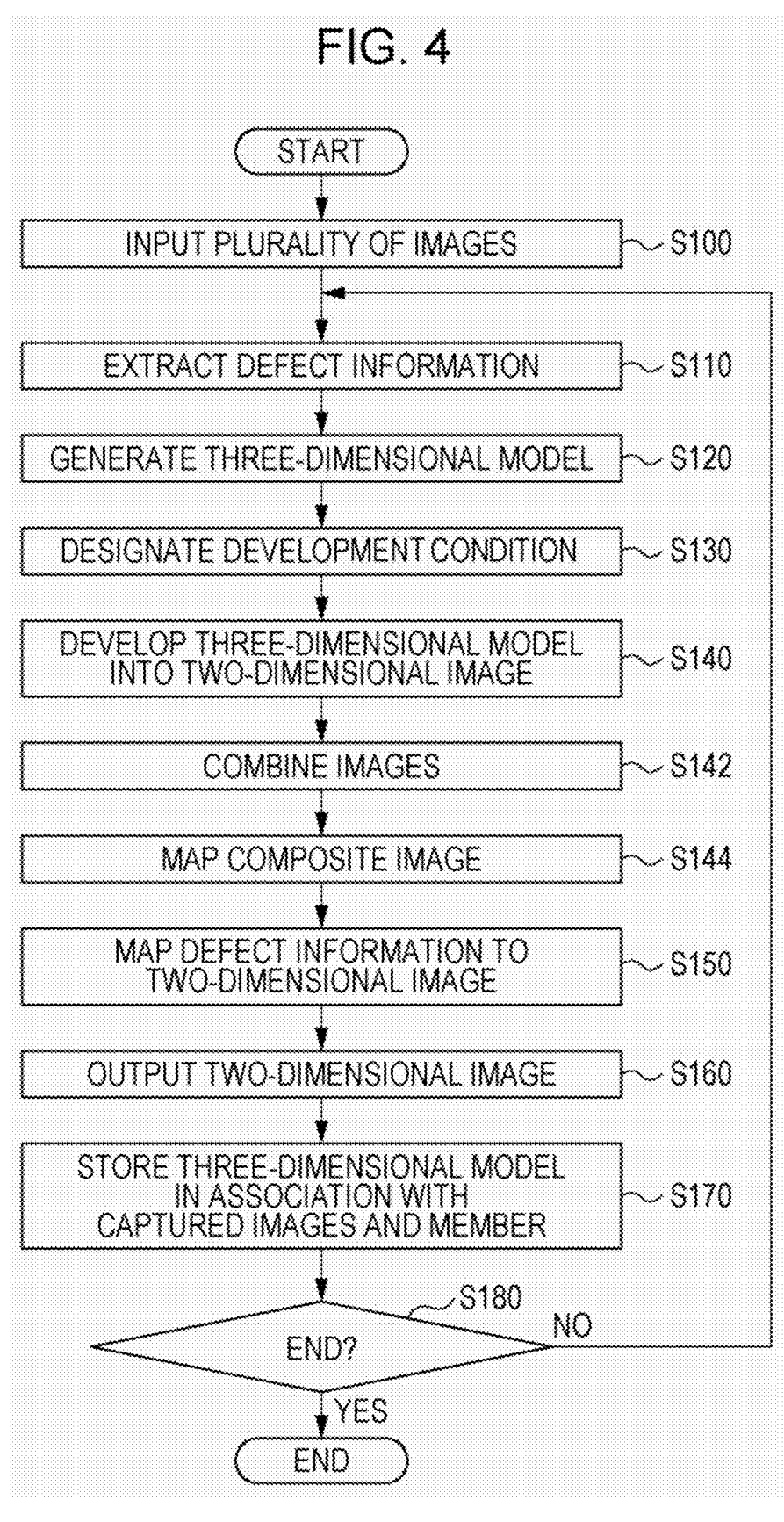
FIG. 4 is a flowchart illustrating processing of an image processing method.

FIG. 4 is a flowchart illustrating a procedure of an image processing method according to the present invention.

Input of Image

Figure 5:
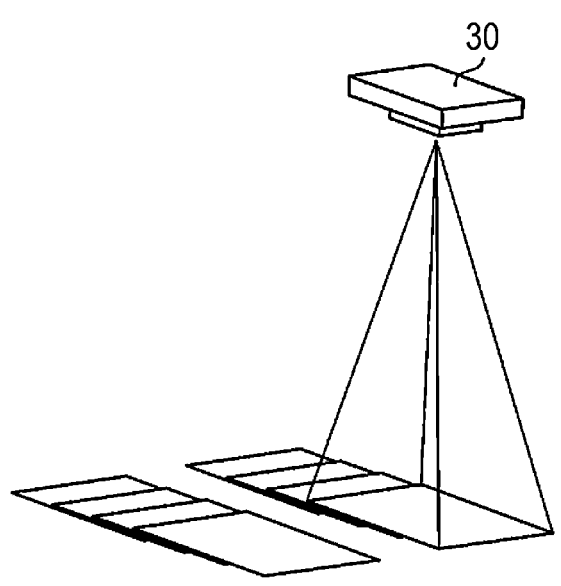
FIG. 5 is a diagram illustrating how an image group is acquired.

The input processing unit 102 (processor) inputs a plurality of images obtained by capturing images of a building as a photographic subject (step S100: input process or input step). The building (architectural object or structure) is, for example, a bridge, a road, or the like, or may be another building. The input processing unit 102 may input images stored in the storage device 200 as the captured images 202, or may input images via a recording medium or a network (not illustrated). These images can be captured by a flying object such as a drone, a robot having a moving function, or the like with movement of the viewpoint (or may be captured by the user). The images to be captured need not be stereo images. It is preferable that images have a large number of common feature points to create a three-dimensional model and combine the images. Thus, it is preferable that adjacent images overlap each other sufficiently (for example, 80% or more of the areas). FIG. 5 is a diagram illustrating how such overlapping images are captured with a camera 30.

Extraction of Defects

The extraction processing unit 110 (processor) extracts defect information of the building on the basis of the plurality of input images (step S110: extraction process or extraction step). In the extraction process, the extraction processing unit 110 can extract at least one of the type of a defect, the number of defects, the size of the defect, the degree of the defect, or the change in the degree of the defect over time as defect information.

The extraction processing unit 110 can extract the defect information using various methods. For example, a cracking detection method described in JP4006007B or a method for detecting rust and scale described in JP2010-538258A can be used. Alternatively, the extraction processing unit 110 can extract the defect information using a machine learning method. For example, a learning machine such as a deep neural network (DNN) is generated by machine learning using, as training data, images to which types, sizes, or the like of defects are assigned as labels, and defects can be detected using the generated learning machine.

The extraction processing unit 110 may extract defect information from each individual captured image and combine corresponding pieces of information into one piece, or may extract defect information from one image obtained by combining a plurality of captured images. Defects can be represented as vectors each having a start point and a termination point. In this case, as described in WO2017/110279A, a hierarchical structure between the vectors may be taken into account.

FIG. 6 is a diagram illustrating an example of defect information that is extracted. The extraction processing unit 110 can store the extracted defect information in the storage device 200 as the defect information 208. The defect information can be mapped to a two-dimensional developed image or a three-dimensional model of the building (see step S150 or the like).

Creation of Three-Dimensional Model

Figure 7A:
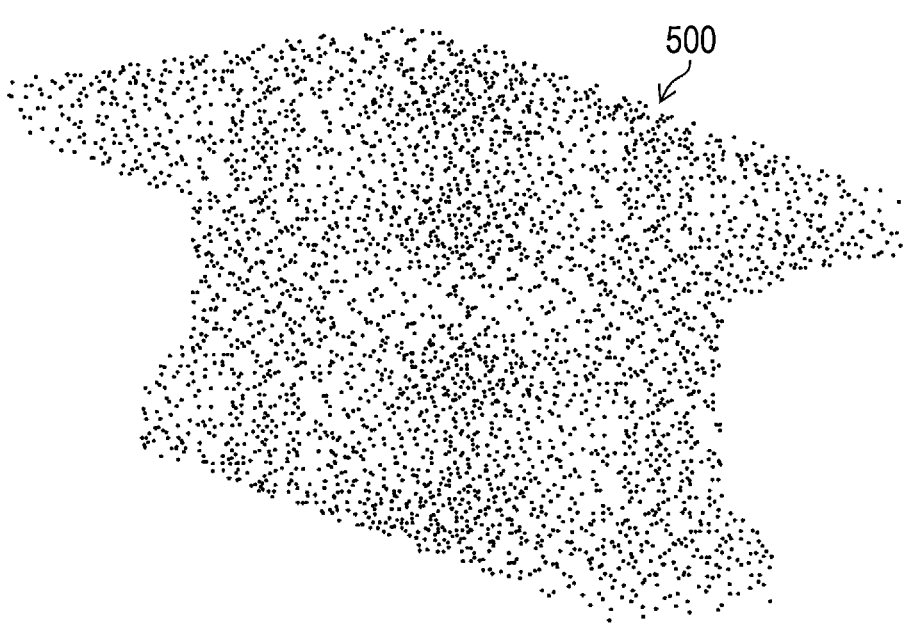
FIGS. 7A and 7B are diagrams illustrating examples of a three-dimensional model.
Figure 7B:
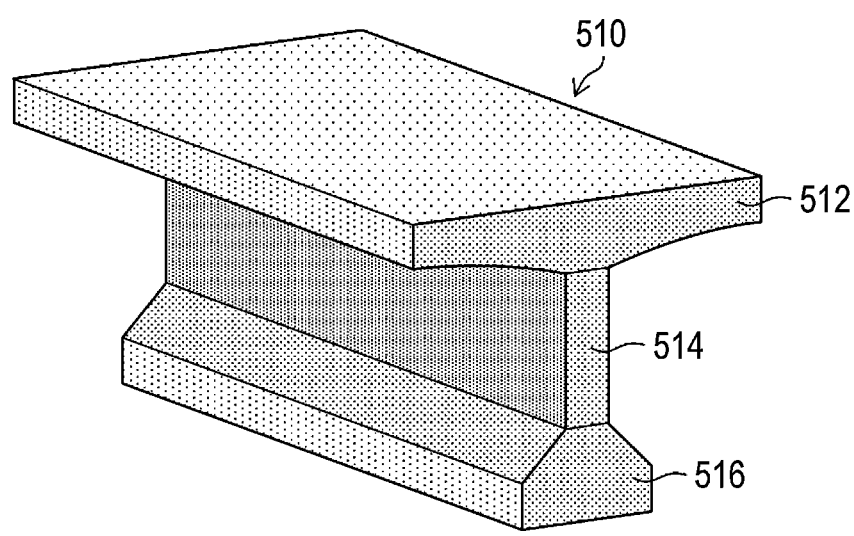

The generation processing unit 106 (processor) creates a three-dimensional model of the building on the basis of the plurality of input images (step S120: generation process or generation step). The three-dimensional model includes various models, such as a three-dimensional point cloud model, a three-dimensional polygon model created based on the three-dimensional point cloud model, a three-dimensional mesh model, a three-dimensional surface model, and models obtained by texture-mapping an image to these models. The generation processing unit 106 can create a three-dimensional model using, for example, a Structure from Motion (SfM) method. SfM is a method of restoring a three-dimensional shape from multi-view images. For example, feature points are calculated by an algorithm such as scale-invariant feature transform (SIFT), and three-dimensional positions of a point cloud are calculated using the principle of triangulation with the calculated feature points as clues. Specifically, straight lines are drawn from the camera to the feature points using the principle of triangulation, and the intersection point of two straight lines passing through the corresponding feature points is the restored three-dimensional point. This operation is performed for each of the detected feature points, and, as a result, the three-dimensional positions of the point cloud can be obtained. FIGS. 7A and 7B are diagrams illustrating examples of a three-dimensional model. FIG. 7A is a diagram illustrating a point cloud 500 (an example of a point cloud). While size is not calculated by SfM, it is possible to perform association with the actual scale by, for example, performing comparison with a member having known dimensions or performing imaging with a scaler having a known dimension installed on the photographic subject.

The generation processing unit 106 applies, for example, a triangulated irregular network (TIN) model to the data of the point cloud obtained in the way described above to approximate the surface of the building with triangles, and can obtain another three-dimensional model (a polygon model, a mesh model, a surface model, a solid model, or the like) on the basis of the result. In the three-dimensional solid model among these models, the three-dimensional shape of a building is constructed as a combination of solid three-dimensional members such as blocks. To obtain the solid model, the user may designate "which range of the point cloud belongs to the same surface" via the operation unit 300, and the generation processing unit 106 may use the result. Alternatively, the generation processing unit 106 may use an algorithm such as random sample consensus (RANSAC) to estimate points belonging to the same surface and automatically generate the solid model without the user's operation. To generate the solid model, the generation processing unit 106 may use information such as the three-dimensional positions, colors (R, G, and B), and luminance of the point cloud and a change in the information.

Figure 18:
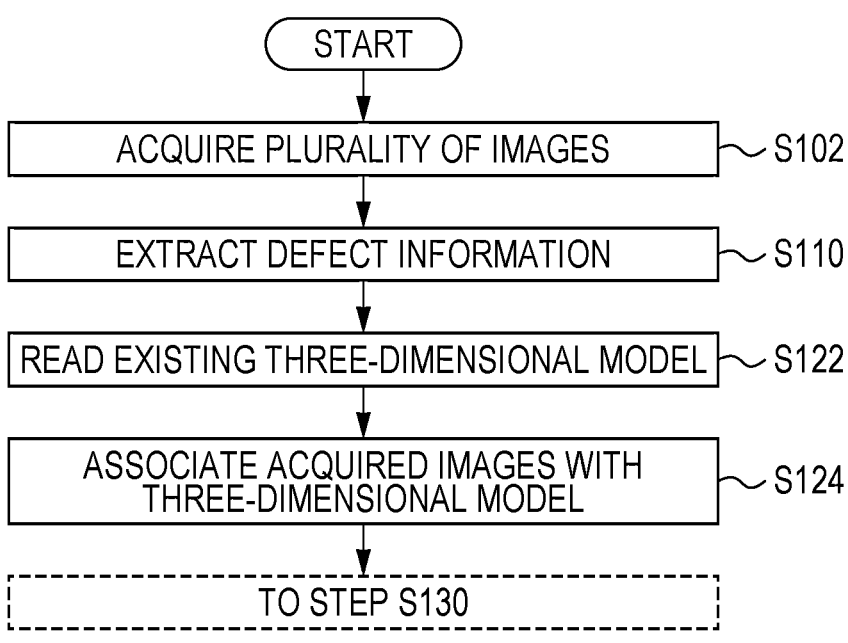
FIG. 18 is a flowchart illustrating a process using a generated three-dimensional model.

If a three-dimensional model has already been generated or acquired by previous inspection or the like, the generation processing unit 106 may read the model (see FIG. 18 and the description related to FIG. 18 described below).

Specification of Members

The generation processing unit 106 (processor) preferably specifies members constituting the building in the three-dimensional model (specification process or specification step). That is, the generation processing unit 106 preferably specifies "to which member of the building each region of the three-dimensional model corresponds". The generation processing unit 106 may specify the members in accordance with the user's operation (for example, designating a range constituting one member with the mouse 320) or may specify the members without the user specifying the members. When specifying a member, the generation processing unit 106 may use information on the shape and dimensions of the member. For example, information such as information indicating that "a member extending two-dimensionally in a horizontal plane and having an area equal to or greater than a threshold is a floor slab" or information indicating that "a member attached to a floor slab and extending one-dimensionally is a main girder" can be used. Further, the generation processing unit 106 may specify the members using a learning machine such as a DNN configured by machine learning in which members constituting a three-dimensional model are given as correct labels. FIG. 7B is a diagram illustrating an example of a three-dimensional model in which members are specified. In the illustrated example, a three-dimensional model 510 of a bridge is constituted by members, namely, a floor slab 512, a wall 514, and a leg 516.

Reconstruction of Three-Dimensional Model

Depending on the image-capturing conditions or the state of the photographic subject, a sufficient number of feature points are not acquired from captured images, and as a result, an accurate model cannot be generated (for example, one surface is incorrectly divided into a plurality of portions, or portions that would be on different surfaces are recognized as being included in the same surface). Accordingly, the generation processing unit 106 (processor) can reconstruct the three-dimensional model in response to an operation (for example, an operation of designating regions that are included in the same surface) performed by the user (reconstruction process or reconstruction step). Such reconstruction enables the user to obtain an appropriate three-dimensional model.

Development of Three-Dimensional Model into Two-Dimensional Image

Figure 8A:
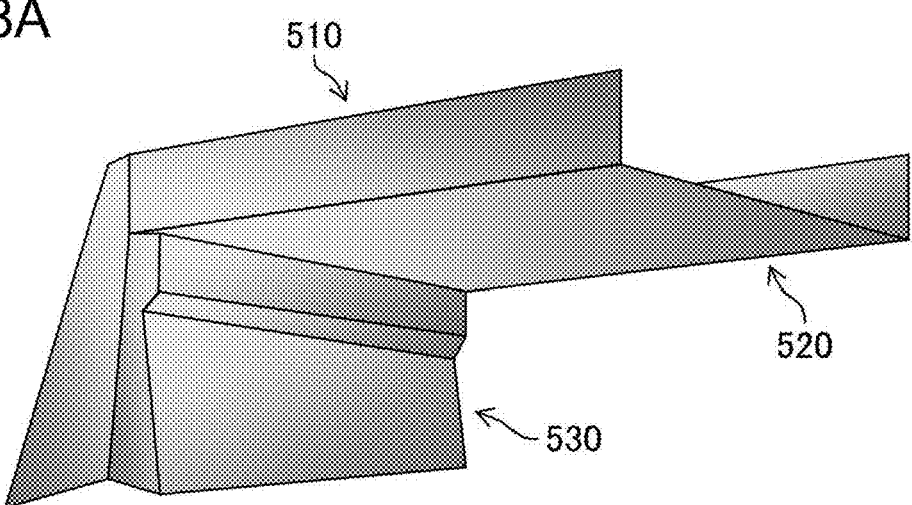
FIGS. 8A, 8B, and 8C are diagrams illustrating how a development condition is set for the three-dimensional model.
Figure 8B:
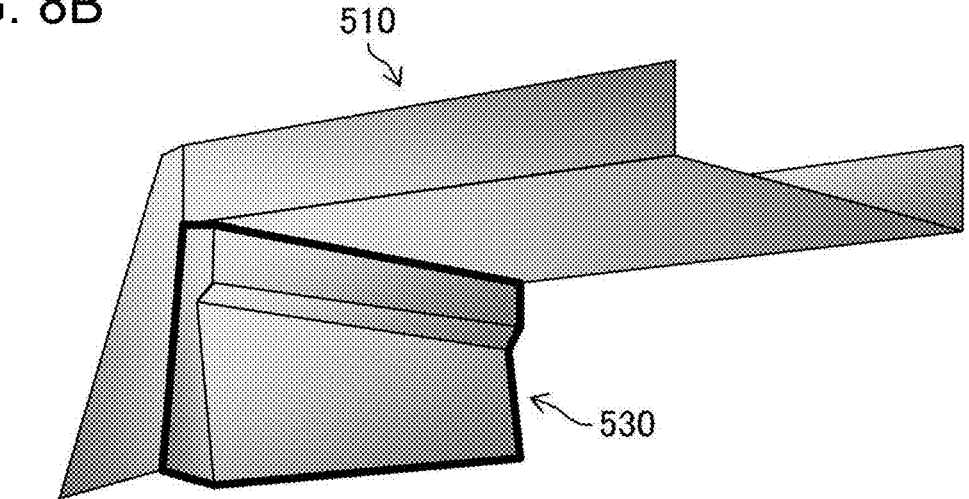
Figure 8C:
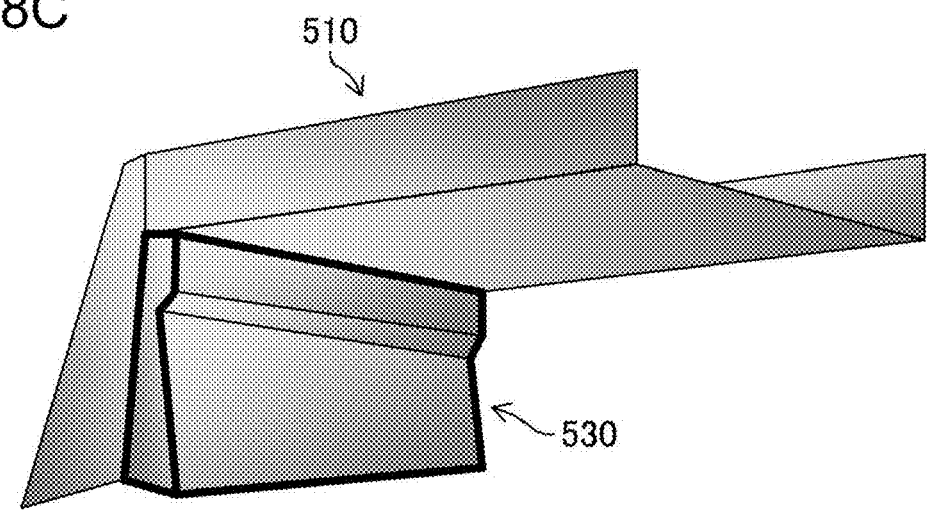

The development processing unit 108 (processor) designates a condition (development condition) for developing the generated three-dimensional model into a two-dimensional image (step S130: designation process or designation step). For example, the development processing unit 108 can designate a range of development and an edge for development (the boundary of surfaces constituting the three-dimensional model) in accordance with an operation performed by the user. The development processing unit 108 may designate the development condition without the user's operation. FIGS. 8A, 8B, and 8C are diagrams illustrating how a development condition is designated for a three-dimensional model. In FIG. 8A, the three-dimensional model 510 (part of the bridge) is constituted by members such as a floor slab 520 and a leg 530. FIG. 8B illustrates designation of the leg 530 (portion indicated by thick lines) as the development range in accordance with a selection operation with the mouse 320, for example. FIG. 8C illustrates designation of the development range and an edge (portions both indicated by thick lines). The development range may be part or the whole of the three-dimensional model. The designation described above enables the user to develop a desired range with a desired edge. In addition, no need exists to develop an unnecessary portion. This can reduce a load on the system due to the development process.

Figure 9:
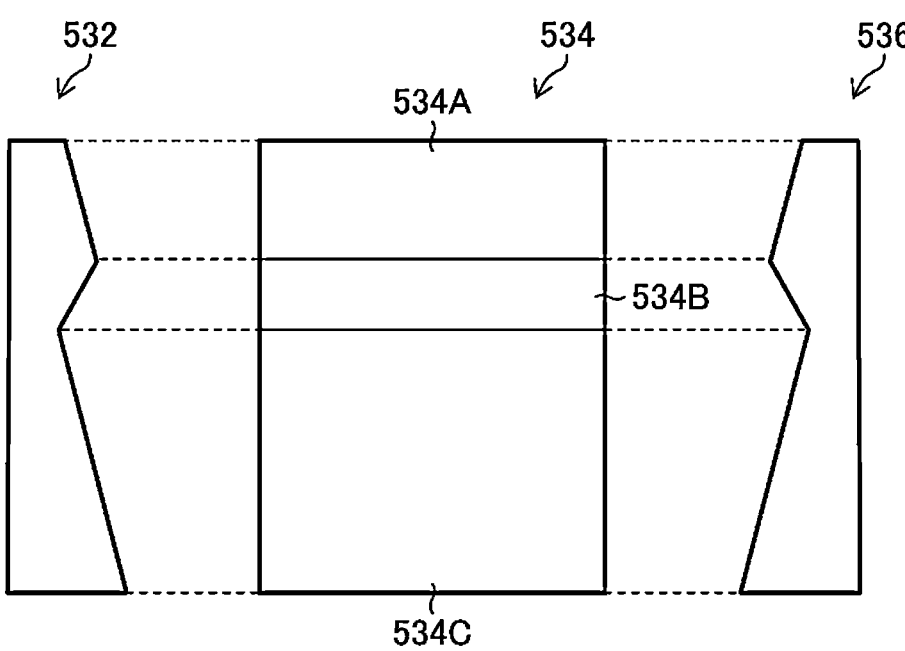
FIG. 9 is a diagram illustrating a two-dimensional image into which the three-dimensional model is developed.

The development processing unit 108 develops the three-dimensional model into a two-dimensional image under the designated condition (step S140: development process or development step). FIG. 9 is a diagram illustrating that the designated range (the leg 530) of the three-dimensional model 510 illustrated in FIG. 8C is developed along the designated edge. In FIG. 9, the designated range is developed into a left side surface 532, a wall surface 534, and a right side surface 536.

Development with Normal Directions Aligned

Figure 10:
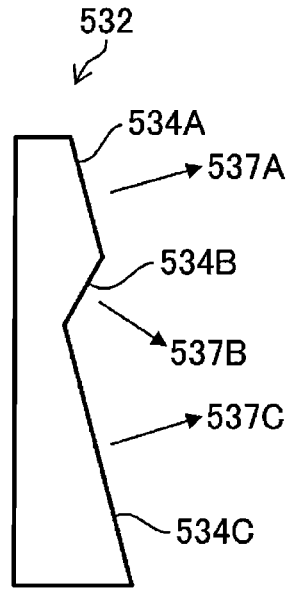
FIG. 10 is a diagram illustrating a leg viewed from the side corresponding to a left side surface.
Figure 11:
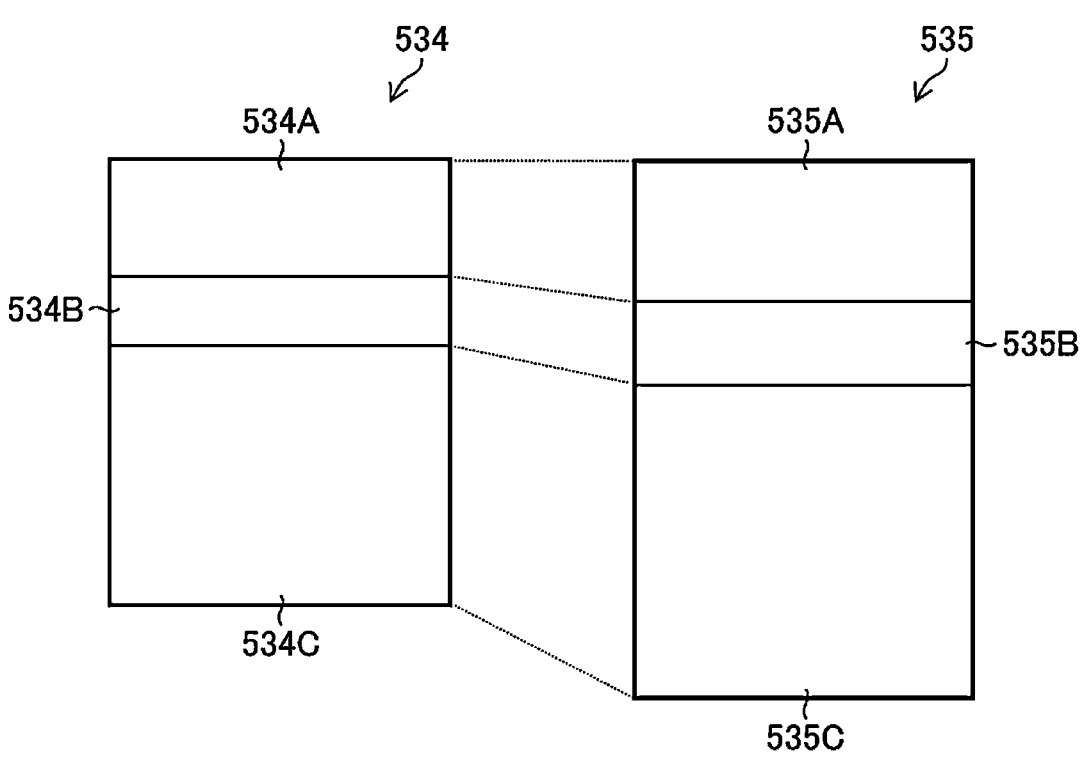
FIG. 11 is a diagram illustrating two-dimensional development with normal directions aligned.

FIG. 10 is a diagram illustrating the leg 530 viewed from the side corresponding to the left side surface 532. The wall surface 534 is constituted by regions 534A, 534B, and 534C whose normal directions are directions indicated by vectors 537A, 537B, and 537C, respectively, the normal directions being different from each other. In this case, the development processing unit 108 can align the normal directions of regions constituting a two-dimensional image. For example, as illustrated in FIG. 11, the development processing unit 108 can develop the wall surface 534 to produce a wall surface 535 constituted by regions 535A, 535B, and 535C with the direction perpendicular to the plane of the figure (the side closer to the viewer) being represented by a normal vector. The development described above enables the user to observe individual regions of a subject from the same direction.

Division-Based Development of Curved Surface

Figure 12A:
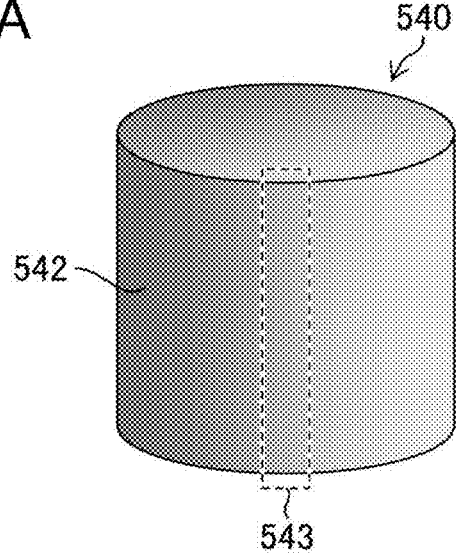
FIGS. 12A, 12B, and 12C are diagrams illustrating how two-dimensional development is performed using meshes having a designated width.
Figure 12B:
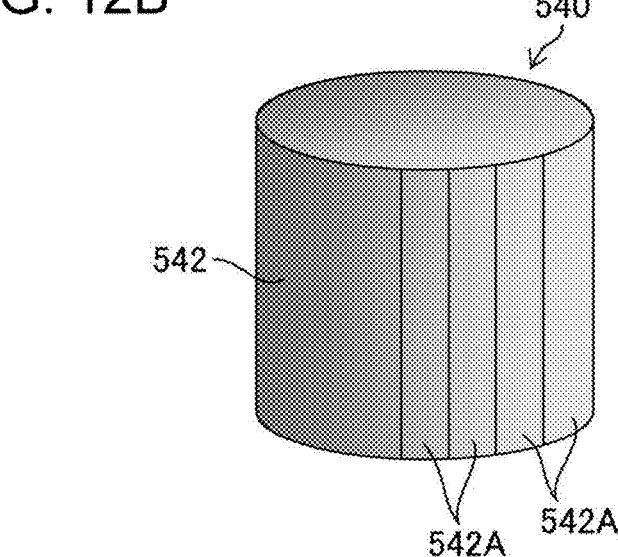
Figure 12C:
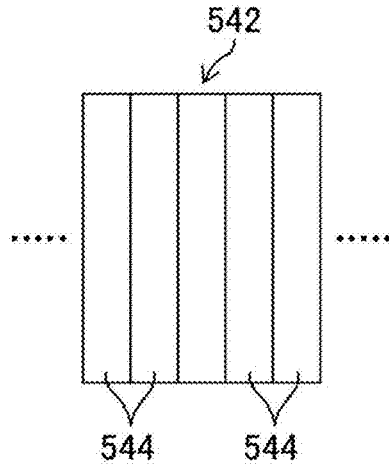

The development processing unit 108 can develop a three-dimensional model such that a portion of the three-dimensional model including a curved surface is divided into planes having a designated size. FIGS. 12A, 12B, and 12C are diagrams illustrating a designation of the size of a plane (the width of a mesh). FIG. 12A is a diagram illustrating that the width of a plane (the width of a portion indicated by a dotted-line box) is designated in a side surface 542 of a cylindrical three-dimensional model 540 by a rectangular region 543. FIG. 12B illustrates that a portion of the side surface 542 is divided into regions 542A having the designated width. The development processing unit 108 can designate the size of a plane for division, such as the rectangular region 543, in response to selection by the user with the mouse 320, for example. FIG. 12C illustrates that the side surface 542 is divided into a plurality of planes 544 having the designated size (width) and two-dimensionally developed.

Figure 13A:
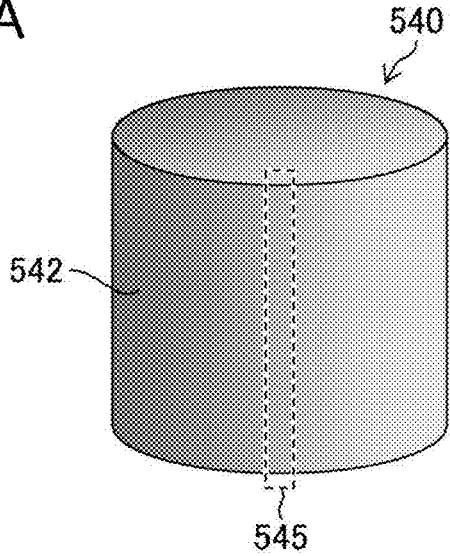
FIGS. 13A, 13B, and 13C are other diagrams illustrating how two-dimensional development is performed using meshes having a designated width.
Figure 13B:
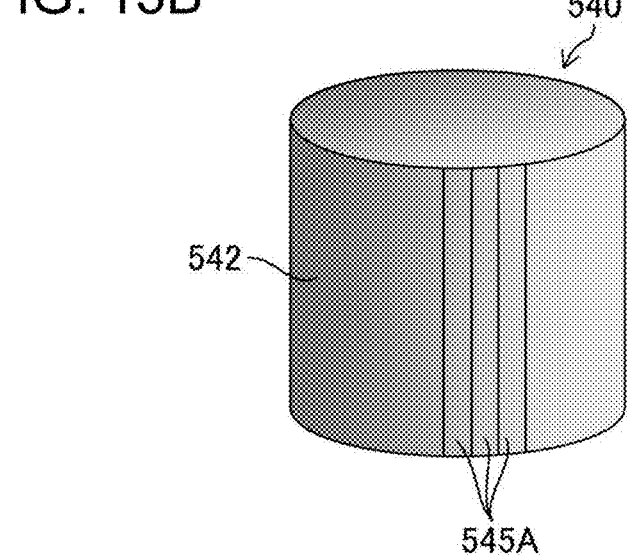
Figure 13C:
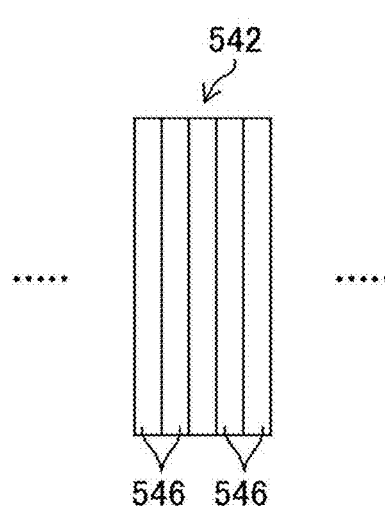

FIGS. 13A, 13B, and 13C are diagrams illustrating another designation of the size of a plane (the width of a mesh). FIG. 13A is a diagram illustrating that the width of a plane is designated for the three-dimensional model 540 by a rectangular region 545. The rectangular region 545 has a narrower width than the rectangular region 543 illustrated in FIG. 12A. Likewise, FIG. 13B illustrates that a portion of the side surface 542 is divided into regions 545A having a designated width, and FIG. 13C illustrates that the side surface 542 is divided into a plurality of planes 546 having the designated size (width) and two-dimensionally developed.

The development processing unit 108 can designate the size of a plane (the width of a mesh) in consideration of the accuracy of development, the calculation load, and the like. The size of a plane (the width of a mesh) may be changed for each region of a three-dimensional model. For example, it is possible to increase the width of meshes (coarse meshes) for regions having a flat shape and a nearly flat shape and decrease the width of meshes (fine meshes) for a region having a high curvature. The designation of the width of meshes allows appropriate plane development in consideration of the shape of the building, development accuracy, and the like.

Designation of Edge in Point Cloud Data

Figure 14:
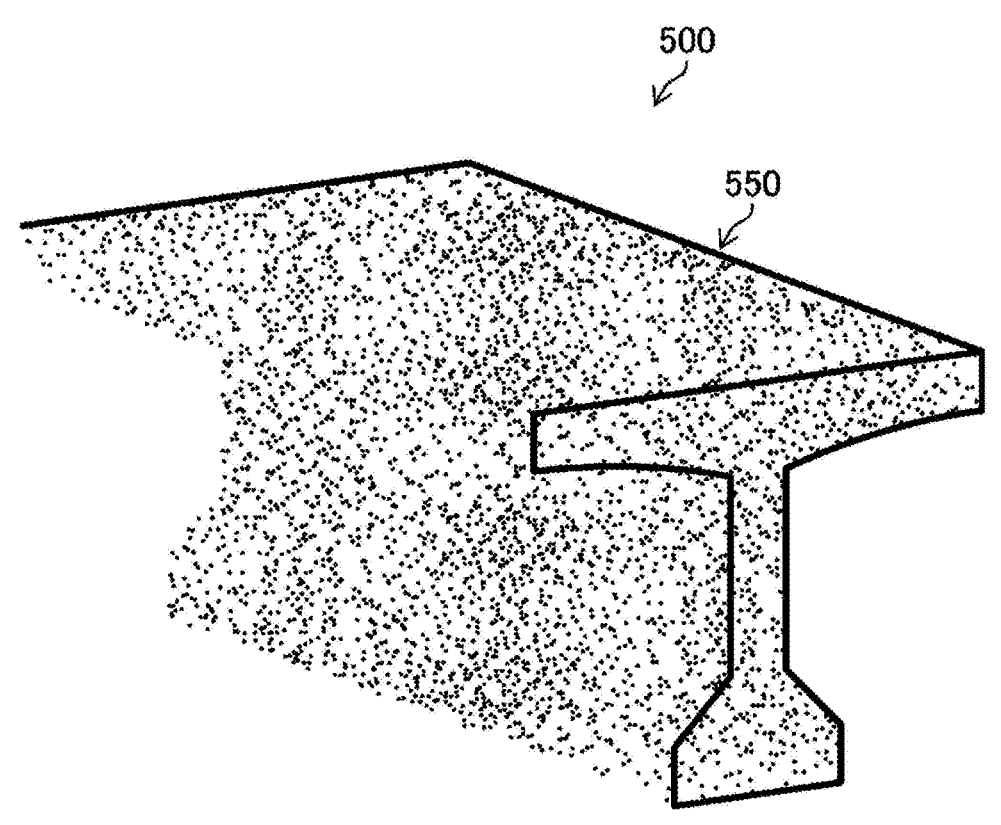
FIG. 14 is a diagram illustrating an edge designated in the three-dimensional point cloud data.

While FIGS. 8A to 8C illustrate an example in which a development range and an edge are designated for a three-dimensional solid model, a development range and an edge may be designated for three-dimensional point cloud data. FIG. 14 is a diagram illustrating designation of an edge 550 for the point cloud 500. The development processing unit 108 can perform this designation in response to selection by the user with the mouse 320, for example.

Generation and Mapping of Composite Image

If the three-dimensional model generated in step S120 is a model of only a shape, the mapping processing unit 112 (processor) can combine a plurality of images (captured images) (step S142: image combining process or image combining step) in a way described below and map the resulting image (composite image) to a two-dimensional image (or the original three-dimensional model) (step S144: mapping process or mapping step).

The mapping processing unit 112 can perform movement, rotation, deformation, or the like such that corresponding feature points between a plurality of images (captured images) can match to combine the images. This method is particularly effective for a planar object, and a high-quality image is obtained. The mapping processing unit 112 can also apply orthogonal projection to project a plurality of images onto the same plane or perform mosaic processing to combine the images. The orthogonal projection and the mosaic processing are effective for an object with irregularities. Accordingly, the mapping processing unit 112 may adopt an image combining method in accordance with the shape of the target (a photographic subject or a building).

Figure 15A:
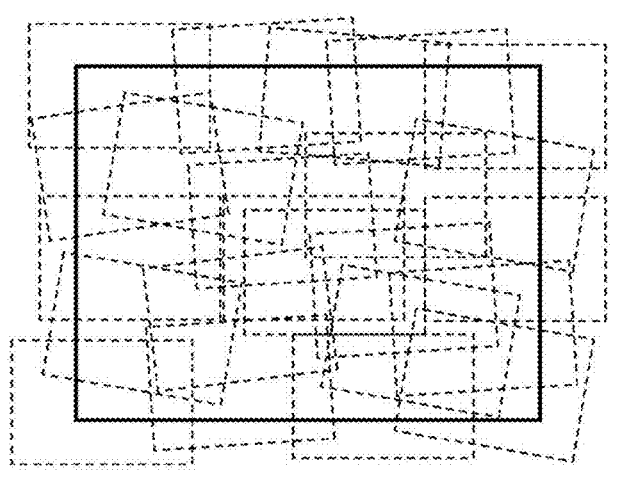
FIGS. 15A and 15B are diagrams illustrating how a composite image is generated.
Figure 15B:
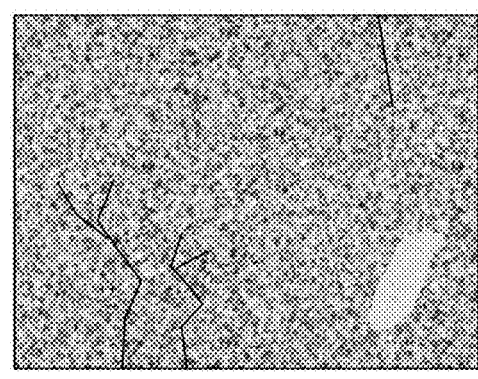
Figure 16:
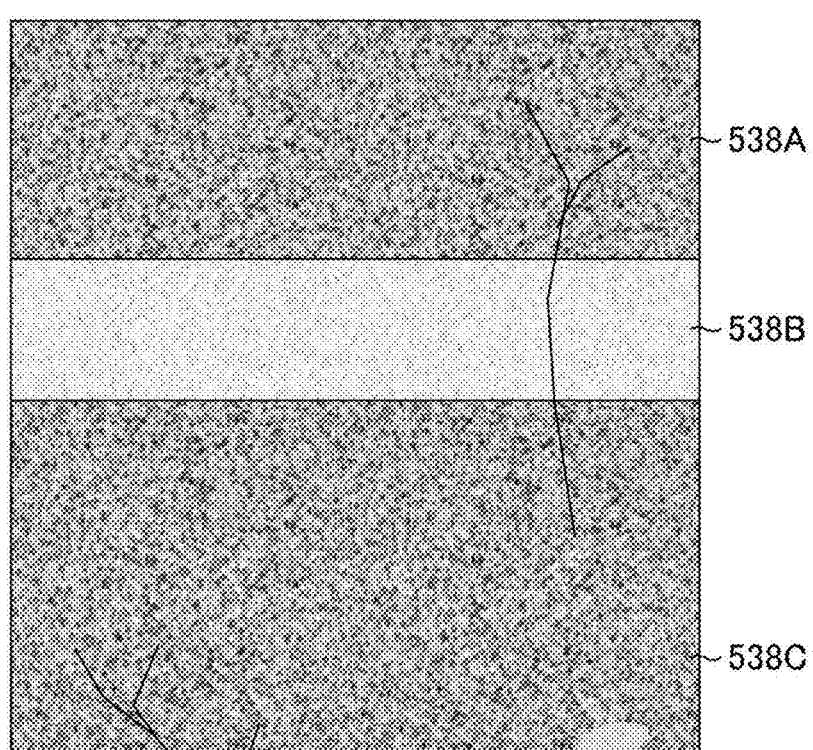
FIG. 16 is a diagram illustrating a two-dimensional image to which the composite image is mapped.

Alternatively, the mapping processing unit 112 can perform mapping by using, for example, surface mapping, UV mapping (mapping using the uv coordinate system in addition to the xyz coordinate system), plane mapping, plane projection, or the like. The mapping processing unit 112 may use a plurality of mapping methods in combination, or may
selectively use a plurality of methods in accordance with the
shape of the three-dimensional model. FIGS. 15A and 15B
are diagrams illustrating combining of images. In FIG. 15A,
dotted-line boxes indicate the ranges of captured images,
and a solid-line box indicates the range of a composite
image. FIG. 15B illustrates an example of the composite
image. FIG. 16 is a diagram illustrating a mapping image
538 obtained by mapping the composite image to a wall
surface 535 of the leg 530. Regions 538A, 538B, and 538C
are regions corresponding to the regions 534A, 534B, and
534C in FIG. 9 and the regions 535A, 535B, and 535C in
FIG. 11, respectively.

The mapping processing unit 112 may generate a com-
posite image from an image group constituting some of the
captured images, or may generate a composite image from
an image group selected by the user's operation or the like.
For example, the mapping processing unit 112 can generate
a composite image from high-quality images (for example,
images with appropriate luminance, less noisy images with
less blurring, or images captured from the front).

Mapping of Defect Information

The mapping processing unit 112 (processor) can map the
defect information extracted in step S110 to a two-dimen-
sional image into which the three-dimensional model is
developed or a two-dimensional image to which the com-
posite image is mapped (step S150: mapping process or
mapping step). The output processing unit 118 (processor)
outputs the two-dimensional image obtained by mapping by
displaying the two-dimensional image on the display device
20, storing the two-dimensional image in the storage device
200 (the two-dimensional developed image 210), or using
any other method (step S160: output process or output step).

Mapping to Three-Dimensional Image

Figure 17:
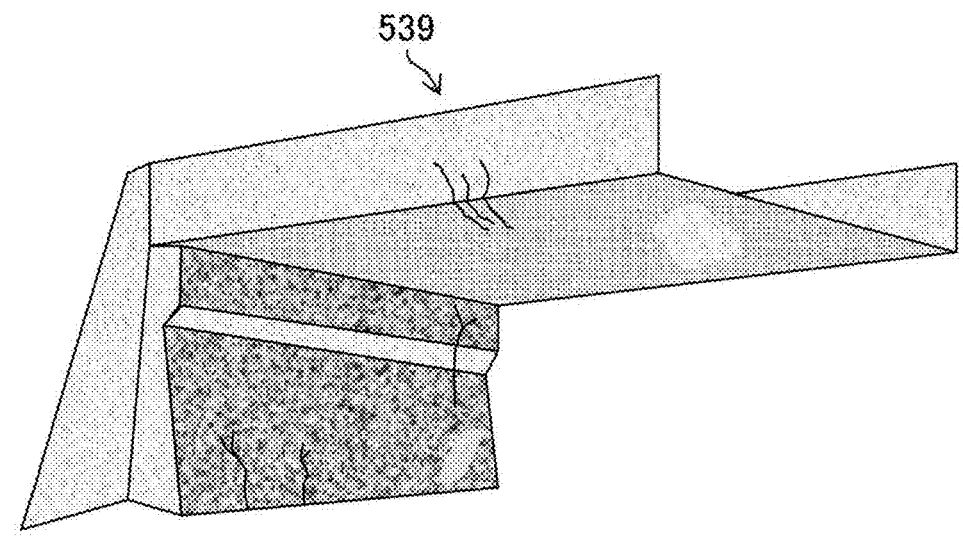
FIG. 17 is a diagram illustrating a three-dimensional model to which the composite image is mapped.

The mapping processing unit 112 can also map the
composite image to the three-dimensional model. FIG. 17 is
a diagram illustrating a mapping image 539 obtained by
mapping the composite image and the defect information to
the three-dimensional model 510 illustrated in FIGS. 8A to
8C.

Storage of Three-Dimensional Model

The storage control processing unit 114 (processor) can
store data indicating the generated three-dimensional model
in the storage device 200 (memory) as the three-dimensional
model data 206 in association with the captured images (the
plurality of input images) and the specified member (step
S170: storage control process or storage control step).

The processing unit 100 (processor) repeats the processes
described above until YES is obtained in step S180.

Through the processing described above, the image pro-
cessing system 1 enables the user to efficiently handle
captured images of a building, a three-dimensional model of
the building, and defect information.

Use of Existing Three-Dimensional Model

While generation of a new three-dimensional model from
captured images has been described with reference to the
flowchart in FIG. 4, the generation processing unit 106 may
read a three-dimensional model that has already been gen-
erated or acquired by a previous inspection or the like. That is, a three-dimensional model need not be generated every
time an image is acquired. FIG. 18 is a flowchart illustrating
a process (an aspect of an image processing method accord-
ing to the present invention) using a generated three-dimen-
sional model. In this flowchart, the acquisition processing
unit 104 (processor) acquires a plurality of images obtained
by capturing images of the building and having different
dates and times of capture (for example, images having new
dates and times of capture) from the plurality of images
stored in the storage device 200 (memory) (previous images
from which the three-dimensional model is generated) (step
S102: acquisition process or acquisition step).

The generation processing unit 106 (processor) reads an
existing three-dimensional model (step S122: reading pro-
cess or reading step). The association processing unit 116
(processor) associates the plurality of images acquired in
step S102 with the read existing three-dimensional model
(step S124: association process or association step). The
association processing unit 116 can perform the association
process (association step) on the basis of, for example, a
correlation between the plurality of acquired images and the
plurality of images stored in the storage device 200. The
subsequent processes (steps) are similar to those in the
flowchart in FIG. 4.

Even when an existing three-dimensional model is used,
extraction of defect information, development of the exist-
ing three-dimensional model into a two-dimensional image,
mapping to the two-dimensional image or the three-dimen-
sional model, and the like can be performed. The user can
efficiently handle captured images of a building, a three-
dimensional model of the building, and defect information
by using an existing three-dimensional model.

While an embodiment of the present invention has been
described, the present invention is not limited to the aspects
described above, and various modifications may be made
without departing from the spirit of the present invention.

REFERENCE SIGNS LIST 1 image processing system
10 image processing apparatus
20 display device
30 camera
100 processing unit
102 input processing unit
104 acquisition processing unit
106 generation processing unit
108 development processing unit
110 extraction processing unit
112 mapping processing unit
114 storage control processing unit
116 association processing unit
118 output processing unit
120 communication control unit
200 storage device
202 captured image
204 composite image
206 three-dimensional model data
208 defect information
210 two-dimensional developed image
300 operation unit
310 keyboard
320 mouse
500 point cloud
510 three-dimensional model
512 floor slab
514 wall 516 leg
520 floor slab
530 leg
532 left side surface
534 wall surface
534A region
534B region
534C region
535 wall surface
535A region
535B region
535C region
536 right side surface
537A vector
537B vector
537C vector
538 mapping image
538A region
538B region
538C region
539 mapping image
540 three-dimensional model
542 side surface
542A region
543 rectangular region
544 plane
545 rectangular region
545A region
546 plane
550 edge
S100 to S180 steps of image processing method

What is claimed is:

1. An image processing apparatus comprising:
a processor; and
a memory in which a plurality of images obtained by capturing images of a building and a three-dimensional model of the building are stored in association with each other, wherein
the processor is configured to:
perform development of the three-dimensional model into a two-dimensional image;
extract at least one of type of a defect, number of defects, size of a defect, degree of a defect, and change in degree of a defect over time as defect information of the building on the basis of the plurality of images;
perform mapping of the defect information to the two-dimensional image; and
output the two-dimensional image to which the mapping is performed,
wherein the three-dimensional model is a three-dimensional surface model or a three-dimensional solid model,
the processor is configured to perform the development by connecting or separating designated surfaces among surfaces constituting the three-dimensional surface model or the three-dimensional solid model along designated edges for a designated range of the three-dimensional surface model or the three-dimensional solid model, for a designated range of the three-dimensional surface model or the three-dimensional solid model,
the processor is configured to receive designation of the edge for the development,
the processor is configured to specify a member of the building using a learning machine configured by machine learning in which members constituting the three-dimensional model are given as correct labels,
the processor is configured to extract the defect information using a learning machine configured by machine learning, and
the processor is configured to associate the three-dimensional model with an actual scale by performing a comparison with a member having known dimensions or analyzing an image of the building which shows a scaler having a known dimension installed on the building.

2. The image processing apparatus according to claim 1, wherein the processor is configured to:
generate the three-dimensional surface model or the three-dimensional solid model on the basis of the plurality of images; and
store the generated three-dimensional surface model or the three-dimensional solid model in the memory in association with the plurality of images.

3. The image processing apparatus according to claim 2, wherein the processor is configured to reconstruct the generated three-dimensional surface model or the three-dimensional solid model such that designated regions of the generated three-dimensional surface model or the three-dimensional solid model are included in the same surface.

4. The image processing apparatus according to claim 1, wherein the processor is configured to:
perform the development by dividing a designated region of the three-dimensional model into planes having a designated size.

5. The image processing apparatus according to claim 1, wherein the processor is configured to align normal directions of regions constituting the two-dimensional image during the development.

6. The image processing apparatus according to claim 1, wherein the processor is configured to perform the development on a designated portion of the three-dimensional model.

7. The image processing apparatus according to claim 1, wherein the processor is configured to generate a three-dimensional point cloud model of the building and generate the three-dimensional surface model or the three-dimensional solid model on the basis of the three-dimensional point cloud model.

8. The image processing apparatus according to claim 1, wherein the processor is configured to generate a composite image based on the plurality of images and perform mapping of the composite image to the two-dimensional image.

9. The image processing apparatus according to claim 8, wherein the processor is configured to generate the composite image such that feature points in the plurality of images match or the plurality of images are projected onto the same plane.

10. The image processing apparatus according to claim 1, wherein the processor is configured to perform:
an acquisition process to acquire a plurality of images obtained by capturing images of the building, the plurality of images having different dates and times of capture from the plurality of images stored in the memory; and
an association process to associate the plurality of acquired images with the three-dimensional model stored in the memory.

11. The image processing apparatus according to claim 10, wherein the processor is configured to perform the association process on the basis of a correlation between the plurality of acquired images and the plurality of images stored in the memory.

12. An image processing method performed by an image processing apparatus comprising a processor, and a memory in which a plurality of images obtained by capturing images of a building and a three-dimensional model of the building are stored in association with each other, the image processing method causing the processor to perform a process including:

a development step of developing the three-dimensional model into a two-dimensional image;

an extraction step of extracting at least one of type of defect, number of defects, size of a defect, degree of a defect, and change of a defect over times as defect information of the building on the basis of the plurality of images;

a mapping step of performing mapping of the defect information to the two-dimensional image; and an output step of outputting the two-dimensional image to which the mapping is performed, wherein the three-dimensional model is a three-dimensional surface model or a three-dimensional solid model, the processor is configured to perform the development by connecting or separating designated surfaces among surfaces constituting the three-dimensional surface model or the three-dimensional solid model along designated edges for a designated range of the three-dimensional surface model or the three-dimensional solid model, for a designated range of the three-dimensional surface model or the three-dimensional solid model, the processor is configured to receive designation of the edge for the development, the processor is configured to specify a member of the building using a learning machine configured by machine learning in which members constituting the three-dimensional model are given as correct labels, the processor is configured to extract the defect information using a learning machine configured by machine learning, and the processor is configured to associate the three-dimensional model with an actual scale by performing a comparison with a member having known dimensions or analyzing an image of the building which shows a scaler having a known dimension installed on the building.

13. A non-transitory computer readable recording medium storing an image processing program for causing a computer to execute the image processing method according to claim 12.

14. The image processing apparatus according to claim 1, wherein the processor is configured to generate a composite image from an image group constituting a part of the plurality of images or an image group selected by a user's operation, and further configured to perform mapping of the composite image to the three-dimensional image or a two-dimensional image obtained by developing the three-dimensional image.

* * * * *